United States Patent [19]

Taylor

[11] Patent Number: 5,460,017
[45] Date of Patent: Oct. 24, 1995

[54] WEIGHT COMPENSATING APPARATUS

[75] Inventor: Gary R. Taylor, Calgary, Canada

[73] Assignee: Eti Technologies Inc., Guernsey, Channel Islands

[21] Appl. No.: 66,307

[22] Filed: May 21, 1993

Related U.S. Application Data

[63] Continuation-in-part of Ser. No. 887,340, May 21, 1992, abandoned.

[51] Int. Cl.⁶ .................................................... D06F 37/22
[52] U.S. Cl. ........................... 68/23.2; 74/573 R; 74/574; 210/144; 301/5.22
[58] Field of Search ........................... 68/23.2; 74/573 R, 74/573 F, 574; 210/144, 363, 364; 494/82; 301/5.22

[56] References Cited

U.S. PATENT DOCUMENTS

| | | |
|---|---|---|
| 1,314,005 | 8/1919 | Louden . |
| 2,103,643 | 12/1937 | Salomon ................................... 74/574 |
| 2,285,404 | 6/1942 | Best . |
| 2,331,756 | 10/1943 | Zobel . |
| 2,958,165 | 11/1960 | Hofmann . |
| 2,984,094 | 5/1961 | Belaieff ................................... 68/23.2 |
| 3,164,413 | 1/1965 | Salathiel . |
| 3,282,127 | 11/1966 | Deakin . |
| 3,316,021 | 4/1967 | Salathiel . |
| 3,410,154 | 11/1968 | Deakin . |
| 3,433,534 | 3/1969 | Mercer . |
| 3,464,738 | 9/1969 | Pierce . |
| 3,696,688 | 10/1972 | Goodrich et al. . |
| 3,724,904 | 4/1973 | Nixon et al. . |
| 3,799,619 | 3/1974 | LaBarber . |
| 3,854,347 | 12/1974 | Hellerich . |
| 3,943,074 | 4/1976 | Cox . |
| 4,075,909 | 2/1978 | Deakin . |
| 4,431,348 | 2/1984 | Powondra . |
| 4,433,592 | 2/1984 | Tatsumi et al. ................... 68/23.2 X |
| 4,524,644 | 6/1985 | Pierrat . |
| 4,674,356 | 6/1987 | Kilgore . |
| 4,711,610 | 12/1987 | Riehl . |
| 4,905,776 | 3/1990 | Beynet et al. . |

FOREIGN PATENT DOCUMENTS

| | | |
|---|---|---|
| 1180575 | 1/1985 | Canada . |
| 0434270A2 | 6/1991 | European Pat. Off. . |
| 748909 | 4/1933 | France ................................... 74/574 |
| 270136 | 7/1989 | Germany . |
| 140064 | 10/1979 | Japan ................................... 68/23.2 |
| 60-215137 | 10/1985 | Japan . |
| 2-229940 | 9/1990 | Japan . |
| 97059 | 2/1961 | Netherlands . |
| 345322 | 5/1960 | Switzerland ........................... 68/23.2 |
| 378068 | 7/1964 | Switzerland . |
| 1744326 | 6/1992 | U.S.S.R. ........................... 74/573 R |
| 832048 | 3/1958 | United Kingdom . |

OTHER PUBLICATIONS

Advertisement entitled "You Will Never Have to Balance Your Wheels Again" regarding an automatic wheel balancer, published by Wheel Masters of San Leanero, Calif., U.S.A.

*Primary Examiner*—Philip R. Coe
*Attorney, Agent, or Firm*—John R. Uren

[57] ABSTRACT

A counterbalancing apparatus for dynamically balancing an out of balance rotating member. A first series of weights having identical size and weight are mounted to freely move within a first groove or race when the apparatus is rotating after being mounted to a shaft or other rotatable member. A second series of weights having identical size and weight are similarly mounted to freely move within a second groove or race located inside of the first groove. The first series of weights is different in size and weight from the second series of weights.

4 Claims, 10 Drawing Sheets

WEIGHT COMPENSATING APPARATUS

CROSS-REFERENCE TO RELATED APPLICATION

This application is a continuation-in-part of application Ser. No. 07/887,340 filed May 21, 1992, and now abandoned.

INTRODUCTION

This invention relates to a balancing method and apparatus and, more particularly, to a balancing method and apparatus used for dynamically balancing an out of balance condition in a rotating body.

BACKGROUND OF THE INVENTION

Many different apparatuses for balancing an out of balance condition in a rotating body are known. Such apparatuses generally include a counterweight having a weight of a predetermined value which is located at a predetermined position from the axis of rotation to oppose an imbalance in the rotating body. The magnitude of the imbalance is generally known and, accordingly, the necessary weight and position of the counterweight can be calculated so that the weight is positioned where it will act to counter the known imbalance. These apparatuses function satisfactorily for most purposes under which they are employed but are not precise or useful enough for other applications.

Under dynamic conditions; that is, when a body is rotating about an axis and an imbalance in the rotating body develops because of external conditions or otherwise, the prior art is much less satisfactorily developed. For example, in a drill bit or in a drillstring, vibration induced forces during operation can create severe unbalances. One technique used to counteract such imbalances is disclosed in U.S. Pat. No. 4,905,776 (Beynet et al). Beynet et al teach a vibration dampening assembly with a plurality of annular grooves or races located about the periphery of the assembly and extending axially therealong. A plurality of balls or rollers are located in each of the races. Such balls or rollers are free to move along the races and thereby counteract the imbalance forces.

A further similar structure is disclosed in U.S. Pat. No. 4,674,356 (Kilgore). Kilgore teaches a plurality of balls freely movable in a race formed in an outer circumferential surface of the body which balls are used to counterbalance an imbalance in the rotating member.

There are, however, disadvantages in such prior art. Although the Beynet et al reference is satisfactory to remove large imbalances from the rotating body, it is difficult to utilise the teachings of Beynet et al where the length of the balancing apparatus is necessarily restricted which is often the case. Likewise, while the teachings of Beynet et al are satisfactory to generally remove large imbalances from the drillstring, there is no provision therein for removing all or most of the remaining imbalance thereafter, particularly the imbalance that may remain when the balls in the races of Beynet et al are located at their optimum positions in the races to counteract the imbalance.

This latter problem is also inherent in the above mentioned Kilgore reference. Kilgore teaches two counterbalance structures, one located at each end of a shaft, to offset the imbalance in the shaft or the unbalanced forces in the rotating structure which is movable with the shaft. If the balls are not located at their optimum positions, the imbalance in the shaft will not be removed.

SUMMARY OF THE INVENTION

According to the invention, there is provided a counterbalancing structural member rotatable about an axis, at least one groove in said structural member being concentric with said axis, at least one weight movable in said groove, and means to retain said weight stationary relative to said groove until said weight moves from one side of the vertical radial extending upwardly from said axis to the other side when said structural member is rotated about said axis.

According to a further aspect of the invention, there is provided a washing machine having a water retaining cylinder rotatable about an axis, at least one cylindrical balancing device having an axis and being mounted concentric to said axis, said balancing device having at least two passageways, movable weights within each of said passageways, said movable weights in said first passageway being all substantially the same size, said movable weights in said second passageway being all substantially the same size, the movable weights in said second passageway being a different size from the movable weights in said first passageway.

According to yet a further aspect of the invention, there is provided a washing machine having a water retaining cylinder being rotatable about an axis, at least one cylindrical balancing device operably connected to said cylinder and having an axis, said balancing device being mounted concentric to said axis, said balancing device including at least one passageway to hold movable weights, said weights being rotatable with said balancing device and being movable relative to said passageway, all of said weights in said passageway being substantially the same size.

According to yet a further aspect of the invention, there is provided a balancing device being operably connected to a rotating member and being concentric with the axis of said rotating member, said balancing device having at least one passageway extending circumferentially about the axis of said balancing device, a plurality of weights within said passageway and being movable relative to said passageway, means to maintain said weights substantially stationary relative to said passageway until a predetermined rotational speed of said balancing device is reached.

According to yet a further aspect of the invention, there is provided an axle for a vehicle or the like, said axle being rotatable about an axis, a balancing device being operably connected to said axle and having a passageway extending about the axis of said axle, a plurality of weights in said passageway and being movable within said passageway, all of said weights in said passageway being substantially the same size.

According to yet a further aspect of the invention, there is provided a compressor having at least one piston operably connected to a rotatable crankshaft, a balancing device being operably connected to said crankshaft and having a circumferential passageway extending about the axis of said crankshaft, said passageway having a plurality of weights movable relative to said passageway, each of said plurality of weights being substantially the same size.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
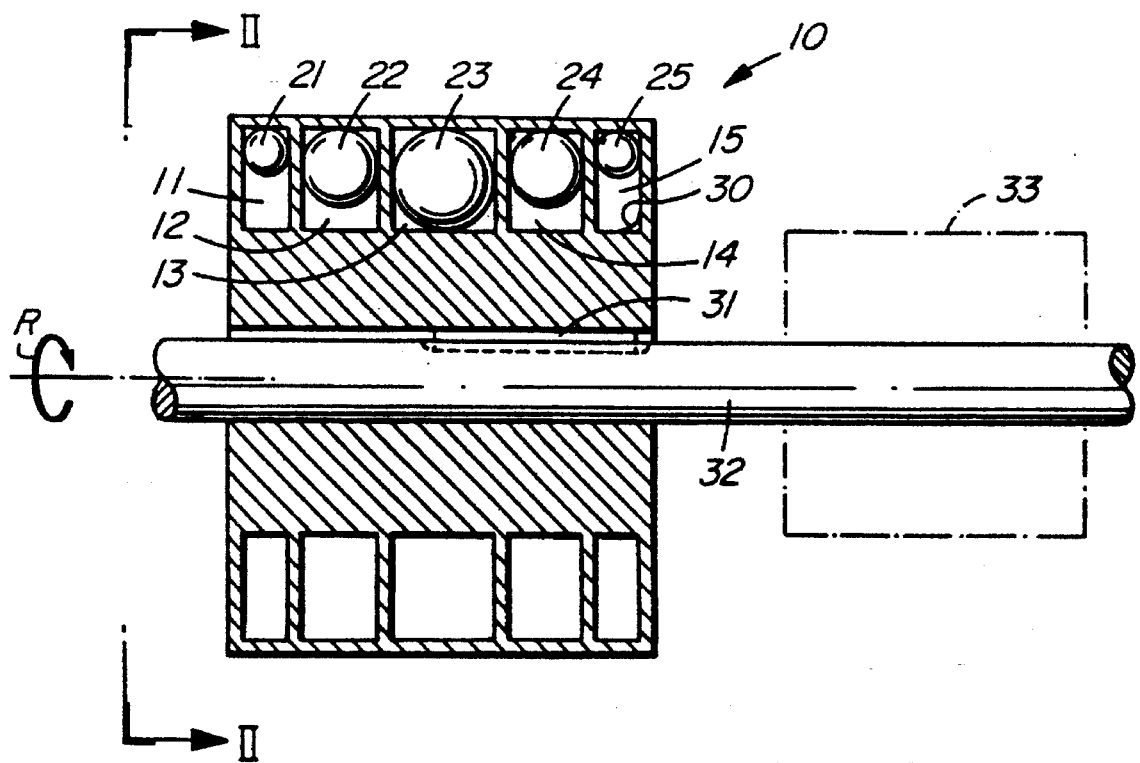
FIG. 1 is a side sectional diagrammatic view of a first embodiment of the counterbalancing apparatus according to the invention.

Referring now to the drawings, a counterbalancing apparatus according to the invention is illustrated generally at 10 in FIG. 1. It comprises a first set of annular grooves 11, 12, 13, 14 and 15, it being understood that oppositely located grooves 11, 15 are conveniently identical and that oppositely located grooves 12, 14 are also conveniently identical.

A plurality of weights 21, 22, 23, 24, 25, conveniently spherical in the form of balls, are mounted in the grooves 11, 12, 13, 14, 15, respectively. The plurality of weights in each of the grooves are all the same size and weight; that is, the weights 21 in groove 11 are all the same size and weight, the weights 22 in groove 12 are all the same size and weight and so on. It is important, however, that the weights in at least two of the grooves be different in size and weight; that is, the weights 23 in groove 13 are preferably larger and heavier than the weights 24 in groove 14.

The balls 21, 22, 23, 24, 25 are freely movable in their respective grooves 11, 12, 13, 14, 15 about the circumference of the counterbalancing apparatus 10. A silicon lubricant 30 is added to the counterbalancing apparatus 10 in order to reduce the friction between the balls and their respective races or grooves and to also reduce the noise made by the balls when the counterbalancing apparatus is in operation as will be described hereafter.

The balls 21, 22, 23, 24, 25 are manufactured from a hardened material such as carbide. Likewise, the races or grooves 11, 12, 13, 14, 15 are hardened. The hardening is desirable in order to retard or prevent the formation of "flats" on the balls or races which tend to reduce the ability of the balls to move freely within the grooves or races and thereby retard the effectiveness of the counterbalancing movement of the balls.

OPERATION

In operation, the counterbalancing apparatus 10 is installed on shaft 32 so as to fixedly rotate therewith such as by using a key 31 between the apparatus 10 and the shaft 32. The operation of an unbalanced member generally illustrated at 33, which creates an out of balance condition, is initiated and shaft 32 rotates with member 33 and counterbalancing apparatus 10 as illustrated.

As an out of balance condition originates within member 33, the balls 21, 22, 23, 24, 25 in each of the grooves 11, 12, 13, 14, 15 move and act to counterbalance the out of balance condition.

It is difficult to precisely state the principle by which the balls are known to move and while it is believed that empirical data will subsequently lead to formulae and better understanding to predict the optimal behaviour of the counterbalancing apparatus 10, the following explanation is given with the expectation that further information presently not known will amplify, modify or change such explanation.

It is believed that the larger balls 23 in groove 13 will remove the larger out of balance condition in member 33. The somewhat smaller balls 22, 24 in grooves 12, 14 will act to remove the somewhat smaller out of balance condition in member 33. Finally, the smallest balls 21, 25 in grooves 11, 15 will act to remove the smallest out of balance condition in member 33. Thus, the entire out of balance condition in member 33 is removed by "fine tuning"; that is, by removing the imbalance under dynamic conditions with a plurality of different sized balls positioned in separate grooves which balls optimally remove different degrees of imbalance.

Figure 2:
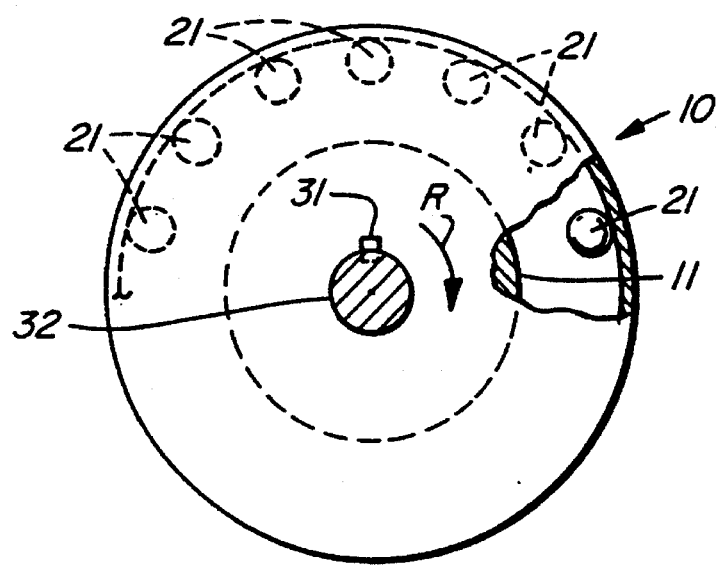
FIG. 2 is an end view taken along II—II of FIG. 1.

With reference to FIG. 2 which illustrates the leftmost groove 11 of FIG. 1 with the balls 21 in a representative and dynamic balanced position offsetting the unbalance in member 33, as viewed with a timing light adjusted for appropriate shaft r.p.m., it has been found that the optimum behaviour for the balls 21 occurs when they do not contact each other in the dynamically balanced position as is illustrated. It has been found that when many of the balls 21 come into contact with each other, the balancing phenomenum is not optimal and modification of the counterbalancing apparatus 10 may be necessary by way of structural or weight changes.

The embodiment of the invention illustrated in FIGS. 1 and 2 is conveniently used when there is a large potential imbalance problem in member 33 under dynamic operating conditions. If the potential imbalance problem in member 33 is small, the number of grooves and associated balls therein can be reduced to as few as two (2), with all of the balls in each respective groove being the same size and weight and the balls of the first groove being different in size and weight from the balls of the second groove, the former balls acting to remove the large imbalance and the latter balls acting to remove a smaller remaining imbalance.

Figure 3:
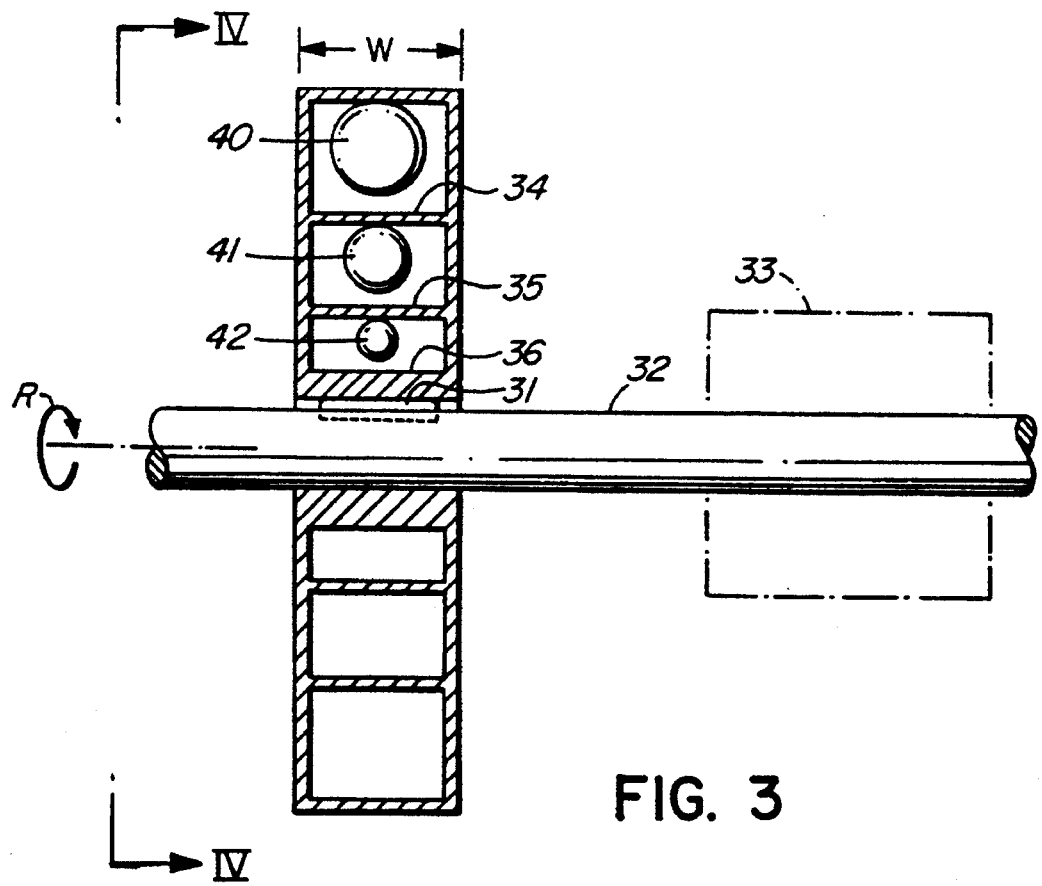
FIG. 3 is a side sectional diagrammatic view of a second embodiment of the counterbalancing apparatus according to the invention.
Figure 4:
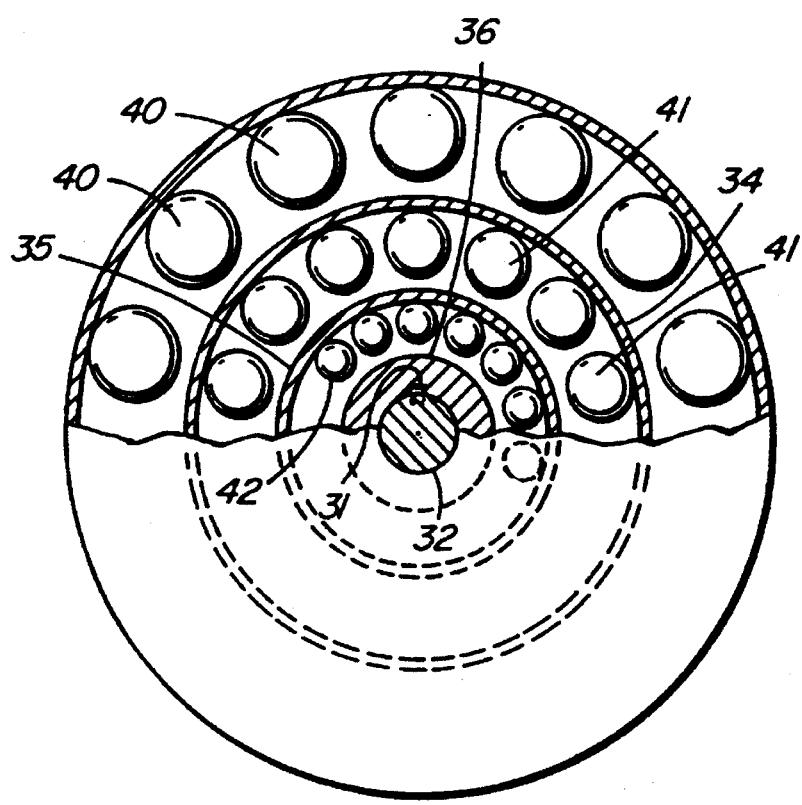
FIG. 4 is an end view taken along IV—IV of FIG. 3.

Referring now to FIGS. 3 and 4, there is illustrated a further embodiment which is desirable when the width "W" as illustrated in FIG. 3 is limited. In this embodiment, there are three grooves or races 34, 35, 36 with balls 40, 41, 42 mounted therein, respectively. The balls 40 in groove 34 are all the same size and weight. The balls 41 in groove 35 are likewise all the same size and weight and the balls 42 in groove 36 are likewise all the same size and weight. The balls 40 in groove 34, however, are larger and heavier than the balls 41 in groove 35 which, in turn, are larger and heavier than the balls 42 in groove 36. Under operating conditions and when an imbalance occurs in member 33 during rotation of shaft 32, the balls 40, 41, 42 will assume positions which counter the imbalance. A representative view of the positions of balls 40, 41, 42 illustrated in FIG. 4 would be positions where the imbalance is removed optimally; that is, and as earlier described, the balls in each race or groove do not contact each other.

Figure 5:
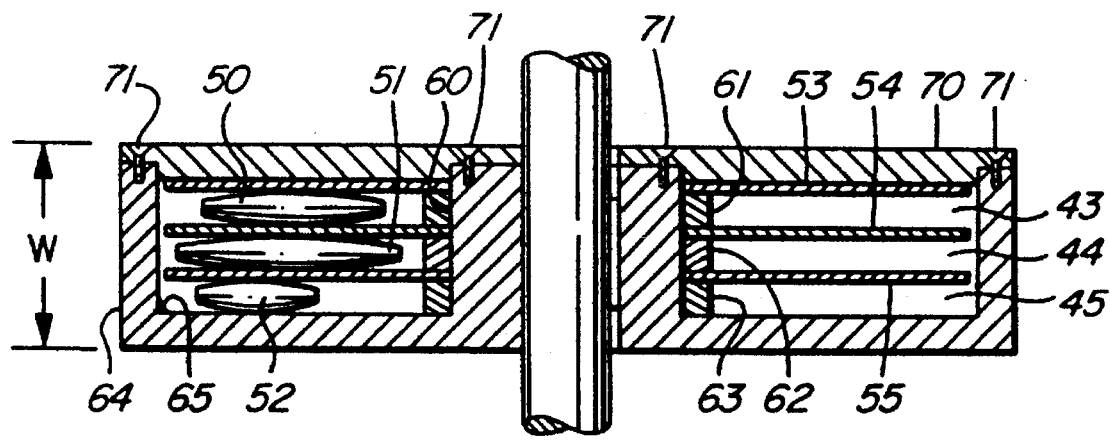
FIG. 5 is side sectional view of yet a further embodiment of the counterbalancing apparatus according to the invention.

A further embodiment of the invention is illustrated in FIG. 5. In this embodiment, wherein the width "W" is again of concern, a first plurality of cylindrical disc-like weights 50, 51, 52 are positioned to be freely movable in each of the grooves 43, 44, 45 which grooves 43, 44, 45 are formed by circumferential dividers 53, 54, 55 which are positioned over hub 60 and between spacers 61, 62, 63. A silicon lubricant 65 is added to the interior of the housing 64 and a closure member 70 is connected to the housing 64 by the use of cap screws 71.

In operation, the housing 64 is fixedly mounted on the rotating shaft 32 as described in association with the method of FIG. 1. As an imbalance arises in member 33, the cylindrical weights 50, 51, 52 will freely move within the grooves 43, 44, 45 until they assume a position wherein they counterbalance the imbalance occurring in the member 33. It has been found that it is preferable to give the sides of the cylindrical disks 50, 51, 52 a slight bow in order that the discs 50, 51, 52 contact the dividers 53, 54, 55 with a minimal surface area wherein they are not influenced by any possible suction which might otherwise occur between the dividers 53, 54, 55, the silicon lubricant 65 used and the discs 50, 51, 52 of the FIG. 5 embodiment. It is preferable that the cylinders or discs 50, 51, 52 move as freely as possible within the grooves 43, 44, 45 between the dividers 53, 54, 55 as is likewise true for the weights and balls of the FIGS. 1 and 3 embodiments.

Figure 6:
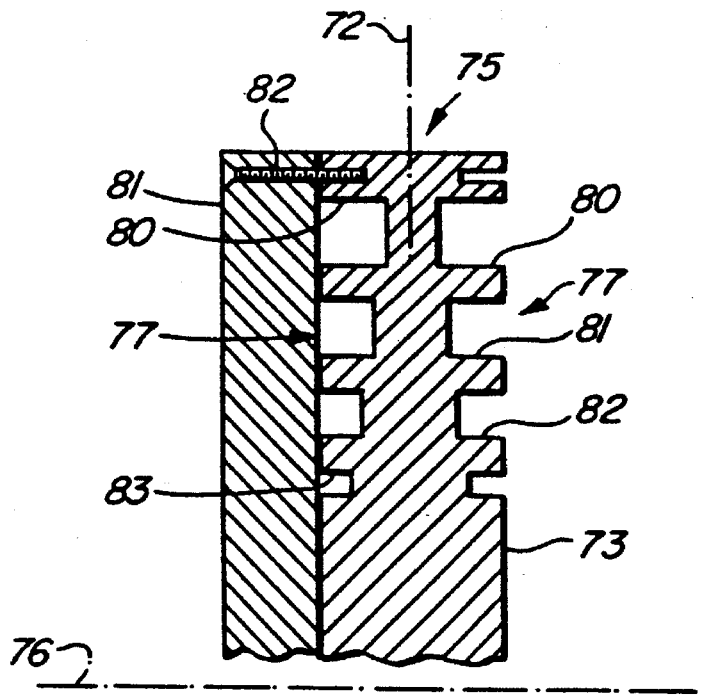
FIG. 6 is a side sectional diagrammatic view of yet a further embodiment of the counterbalancing apparatus according to the invention.
Figure 7:
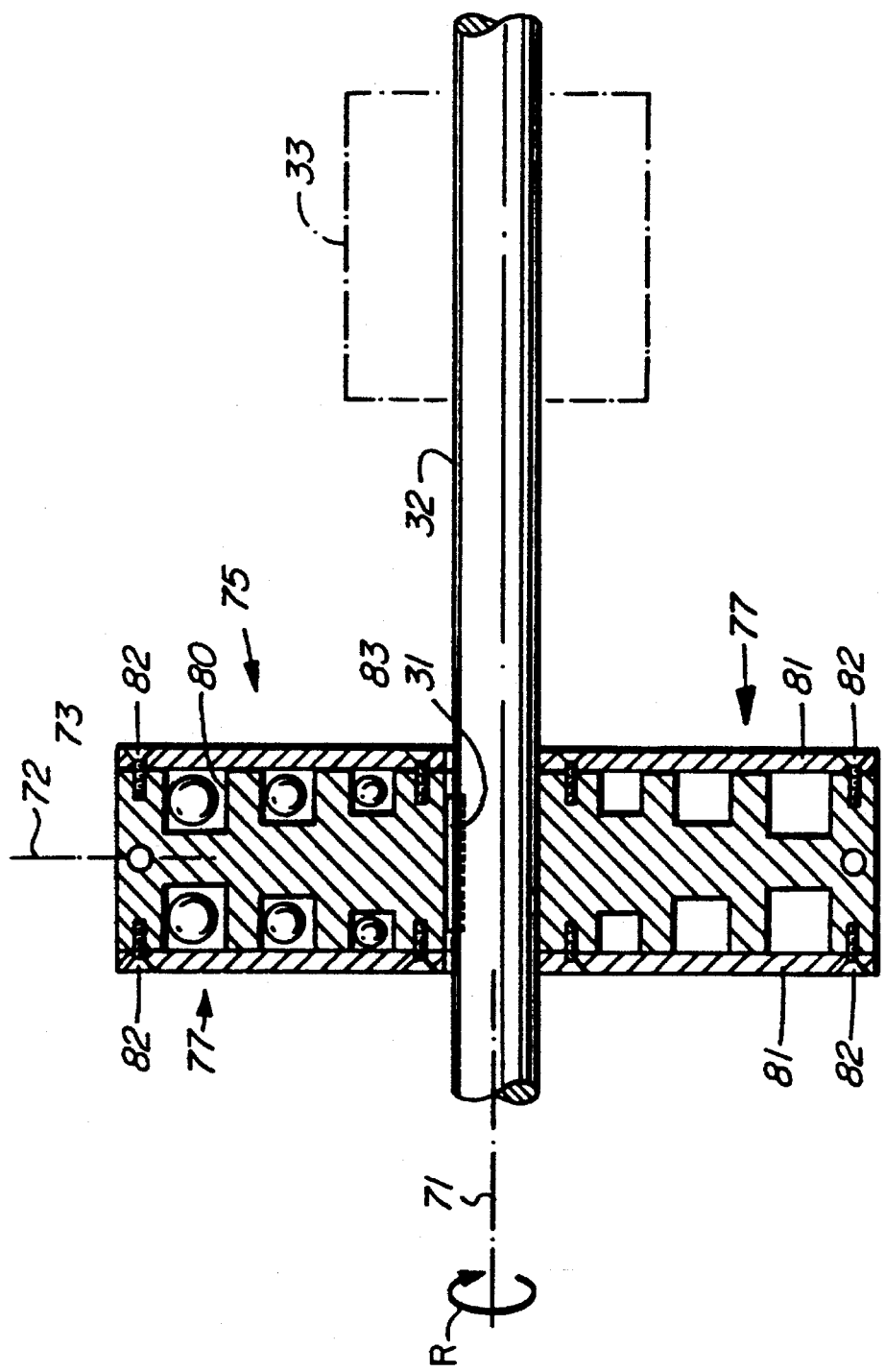
FIG. 7 is a side sectional diagrammatic view of the apparatus of FIG. 6 illustrated in its operating position.

Yet a further embodiment of the invention is illustrated in FIGS. 6 and 7, FIG. 6 illustrating four (4) grooves or races and FIG. 7 illustrating only three (3) grooves or races. In this embodiment, the counterbalancing apparatus generally illustrated at 70 is symmetrical about both axes 71, 72 and is mounted to a shaft 32 similar to the FIG. 1 embodiment.

In this embodiment, however, a central circumferential member 73 made from a solid piece of material is machined with a plurality of annular grooves generally illustrated at 74 on both faces. Balls (FIG. 7) are mounted in the grooves 80, 81, 82, 83, the balls mounted in the outermost groove 80 being the largest and the balls in the innermost groove 83 being the smallest. After providing the silicon lubricant within each of the grooves 74, two end plates 81 are mounted to the central circumferential member 73 by the use of cap screws 82. The operation is similar to the operation of the FIG. 3 embodiment; that is, when an imbalance occurs in member 33, the balls in each groove will assume a position wherein the imbalance is removed.

It is not again presently known why such is the case, but it has been found that seven (7) balls or weights in each groove or annular space of each of the embodiments appear to be an optimal number. It is, however, also believed that a greater or smaller number of balls or weights would usefully serve to remove various imbalances under various operating conditions.

A rule of thumb has arisen which has been helpful to the applicant in its current product development. It has been found that the quantity of the imbalance that may be potentially removed from an out of balance member by the counterbalancing apparatus is the sum of the weights in each of the grooves or races of the counterbalancing apparatus.

Figure 8A:
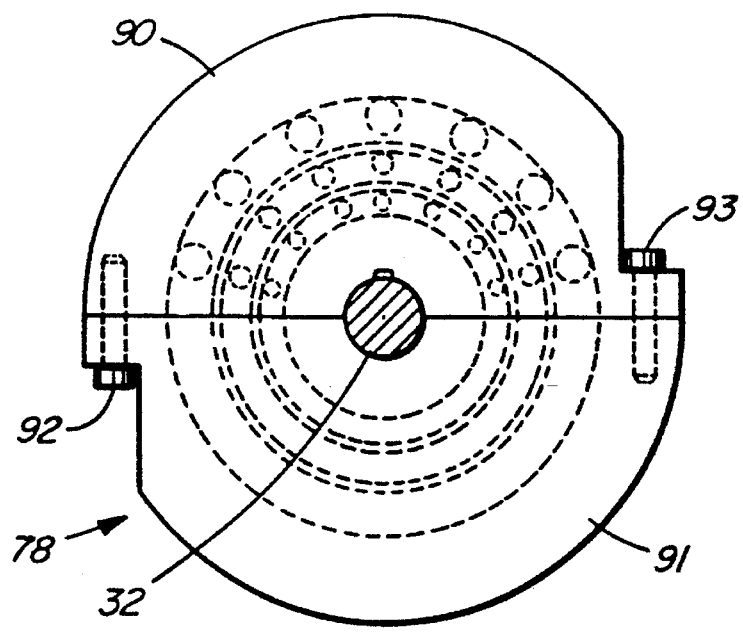
FIGS. 8A and 8B are end views of a further embodiment of the invention mounted about a shaft and illustrating the counterbalancing apparatus in assembled and disassembled condition about the shaft, respectively.
Figure 8B:
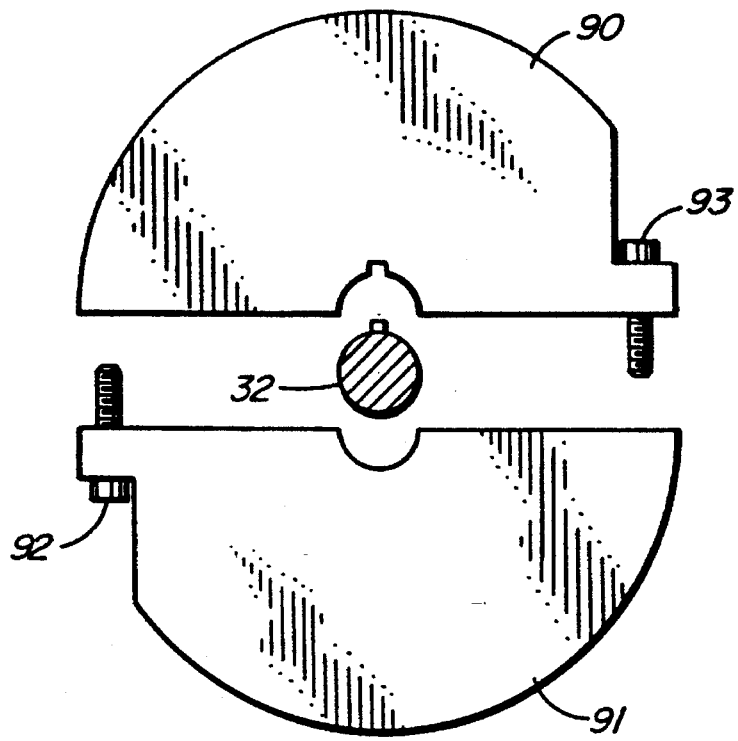

A further embodiment of the invention is illustrated in FIGS. 8A and 8B. In this embodiment, the counterbalancing apparatus 74 according to the invention is illustrated as being made from two sections 90, 91, which sections are mounted about shaft 32 by cap screws 92, 93 and which sections 90, 91 are freely removed from shaft 32 by removing the cap screws 92, 93. This embodiment is particularly useful where minimal modifications are desirably made to the rotating shaft 32 or to the out of balance member 33. Rather, the counterbalancing apparatus 74 is simply connected to the shaft 32 at a position where it is possible so to attach the counterbalancing apparatus 74 and the cap screws 92, 93 are tightened to firmly couple the apparatus 74 to the shaft 32.

Figure 9:
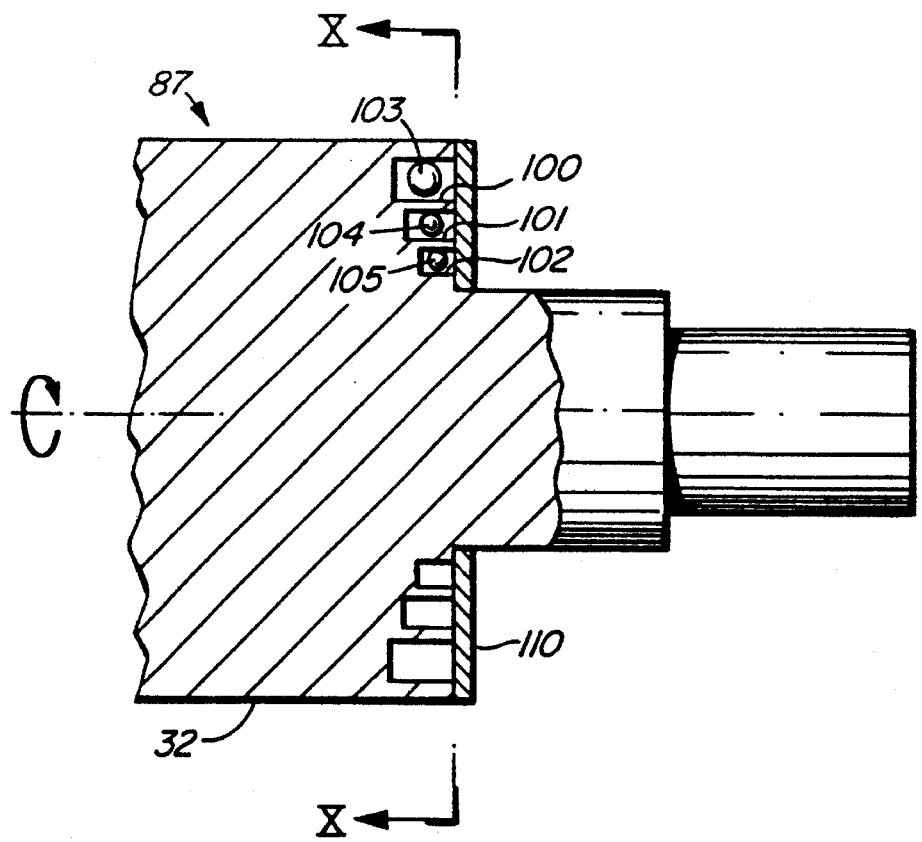
FIG. 9 is a diagrammatic side view of yet a further embodiment, the counterbalancing apparatus according to the invention being operably located within a shaft.
Figure 10:
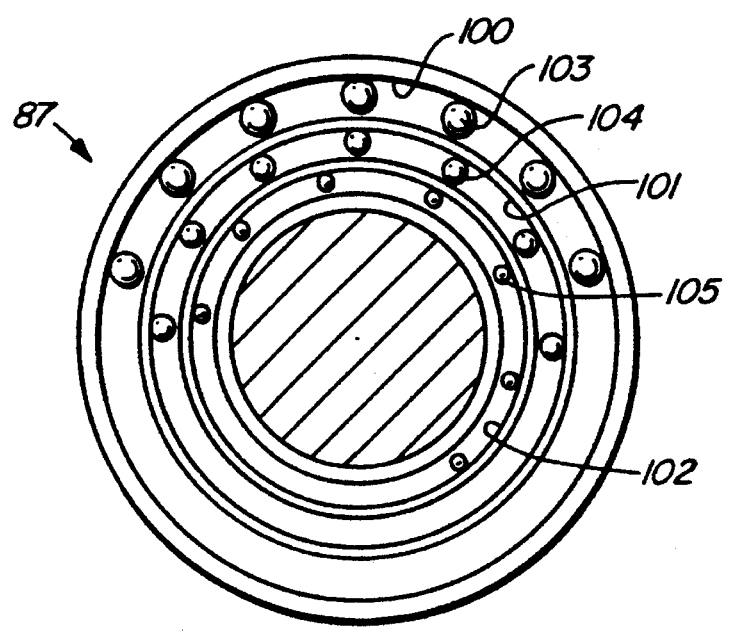
FIG. 10 is a diagrammatic end view taken along X—X of FIG. 9 illustrating a representative position of the movable weights during rotation of the shaft in which the apparatus is located.

Yet a further embodiment is illustrated in FIGS. 9 and 10. In this embodiment, it is contemplated that the counterbalancing apparatus 74 is mounted inside the outer circumference of a rotating shaft 32. As illustrated in FIG. 9, the grooves or races 100, 101, 102 are machined directly into the solid material of shaft 32 and the balls 103, 104, 105 are positioned directly therein for free movement relative thereto. A cover 110 is connected to the shaft 32 and the balls 103, 104, 105 are thereby retained. In operation, as an out of balance condition occurs either in the out of balance member 33 (FIG. 1) or in shaft 32 itself, the balls 103, 104, 105 will orient themselves in a configuration such as the configuration illustrated in FIG. 10. In such positions, the shaft 32 and/or the unbalanced member 33 is balanced by the position of the balls 103, 104, 105 under dynamic operation conditions.

It has been found that under certain conditions and particularly at lower r.p.m.'s of the counterbalancing apparatus 10, the weights 21 (FIG. 11) will tend to remain in a substantially stationary position in the groove 11 until the revolutions per minute of the counterbalancing apparatus increase to the point where the weight 21 is carried around the uppermost point of the inside diameter of the groove 11 or from one side of the radial 25 to the other or until the centrifugal force acting on the weights forces them outwardly until they are in an operating engagement with the outer surface of the groove 11 which will then exert a certain friction force that will tend to carry them around with the groove 11. After operating speeds occurs, the weights 21 will then quickly rearrange themselves with minimal movement so as to properly balance any unbalance condition. It has been found, for example, that at higher rotational speeds of the balancing device, the weights 21 within the grooves will quickly rearrange themselves to set off any imbalance in the device. However, at low speeds, this not always the case and, accordingly, it is convenient to utilise means to move the weights with the groove or, at least, to provide a force on the movable weights which will tend to move the weight with the groove as it rotates about its axis.

Any delay in removing the imbalance is not advantageous since if a shaft, for example, being in balance and rotating, suddenly encounters an out-of-balance condition, it is conceivable that the weights 21 may not move quickly enough to remove the out-of-balance condition before damage results to the system.

The means used to improve the "quickness" with which the system responds to remove the out-of-balance condition can take several forms. It is, for example, contemplated that a substance could be added to the grooves 11 so that a force is imparted to the weights 21 which force will be such that the weights 21 will move from a stationary position as indicated to a position "over-the-top" of the member 10 and from one side of the radial 25 extending from the axis 26 of the member 10 to the opposite side. Alternatively, mechanical or electrical means could be used.

Figure 11:
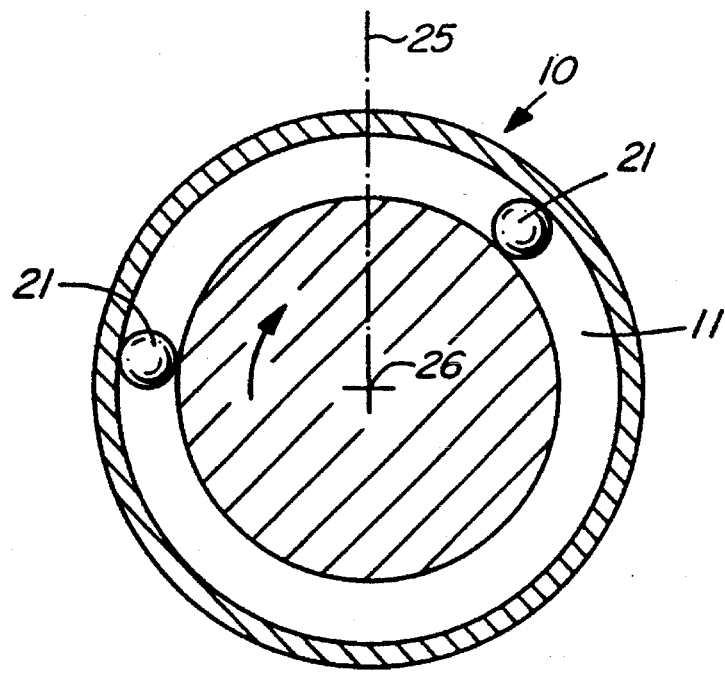
FIG. 11 is a view of the counterbalancing apparatus according to the invention illustrating the vertical radial from the axis of the apparatus.

With reference to FIG. 11, it is contemplated that the initial movement of the weights 21 within the groove 11 may occur by the addition of a substance to the grooves 11 that will initially give a degree of force to the weight so that the movement of the weights 21 is initiated by the substance. For example, such a substance could be a fluid of a consistency to impart the rotational movement to the weights, such as grease. An exhaustive list of all such substances is not immediately contemplated but such a list might include virtually any substance to initiate movement of the weights 21. Even sand is contemplated as such a substance but, of course, sand may be inappropriate because of contamination and eventual binding of the weights 21 within the groove 11 which would affect normal operation where quickness of weight movement may not be necessary.

It is also contemplated that the initial weight movement could be initiated externally of the counterbalancing apparatus 10. For example, if the weights 21 were made of a magnetic material, an external probe (not illustrated) could apply a suitable magnetic field to the weights 21 which would allow the weights 21 to immediately commence movement in the event an unbalanced condition is encountered. This would be intended to reduce the rotation time of the weights 21 so that the unbalanced condition can be removed and would thereby reduce the chance of damage to the out-of-balance apparatus.

Figure 12:
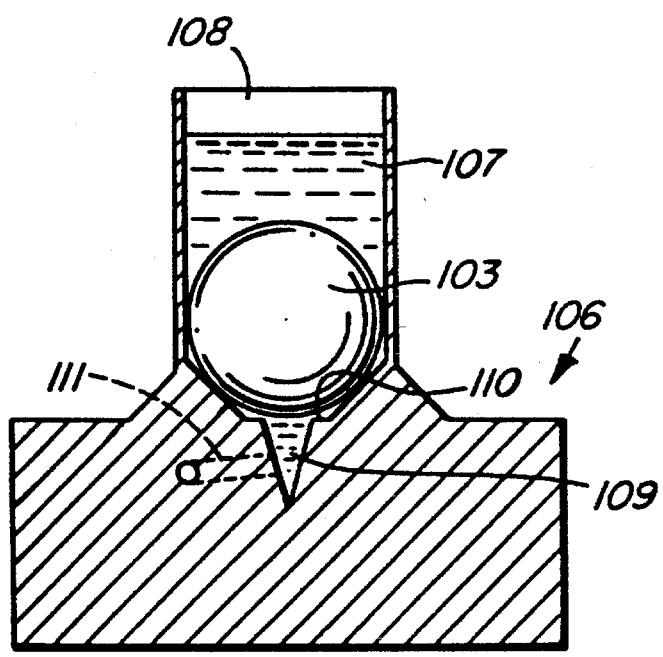
FIG. 12 is a diagrammatic cross-sectional view of a ball retaining apparatus according to a further embodiment of the invention.

Reference is made to FIG. 12 which illustrates the balancing device generally illustrated at 100. A liquid 101 is added to the balancing device 101 and takes a level 102 above the movable weight in the form of ball 103. A V-shaped groove 104 is formed in groove 110 in which ball 103 is intended to move. The V-shaped groove 104 has a plurality of passages 111 which extend from the groove 104 to a liquid reservoir (not illustrated).

In operation and when the balancing device 100 begins to rotate, the liquid 103 will tend to rotate with the groove 110 and, therefore, will exert a force on ball 103 which tend to rotate the ball 103 with the groove 110. As the speed of rotation of the balancing device increases, the centrifugal force on the liquid will increase and, therefore, there will be a tendency for the liquid 101 to exit through passageway 111 and thereby to terminate any further influence over the movement of ball 103 which, by that time, will be rotating at the same speed as the balancing device 100. This is beneficial for the previously mentioned reasons, namely that if the balls 103 move quickly at speed, any imbalance arising will be quickly corrected.

Figure 13:
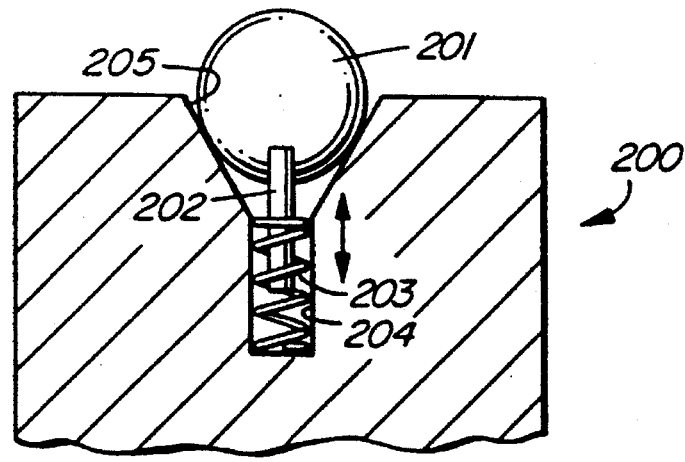
FIG. 13 is a diagrammatic cross-sectional view of a ball retaining pin apparatus according to a further embodiment of the invention.

A further embodiment of the invention is made with reference to FIG. 13. The balancing device generally illustrated at 200 includes a movable weight in the form of a ball 201 and includes a pin 202 which is spring mounted within a radially inwardly extending opening 204. A compression spring 203 acts on the pin 202 to force it outwardly in the position indicated and thereby restrains movement of the ball 201 upon rotation of the balancing device.

As the balancing device 200 commences to rotate, the pin 202 will cause the ball 201 to rotate with the groove 205. The speed will increase and as it does so, the centrifugal force acting on the pin 202 will tend to move the pin 202 inwardly in opening 204 thus allowing the balls 201 to rotate freely in the groove 205 thereby to freely assume any position to connect an imbalance in the rotating machinery to which the balancing device 200 is attached.

Figure 14:
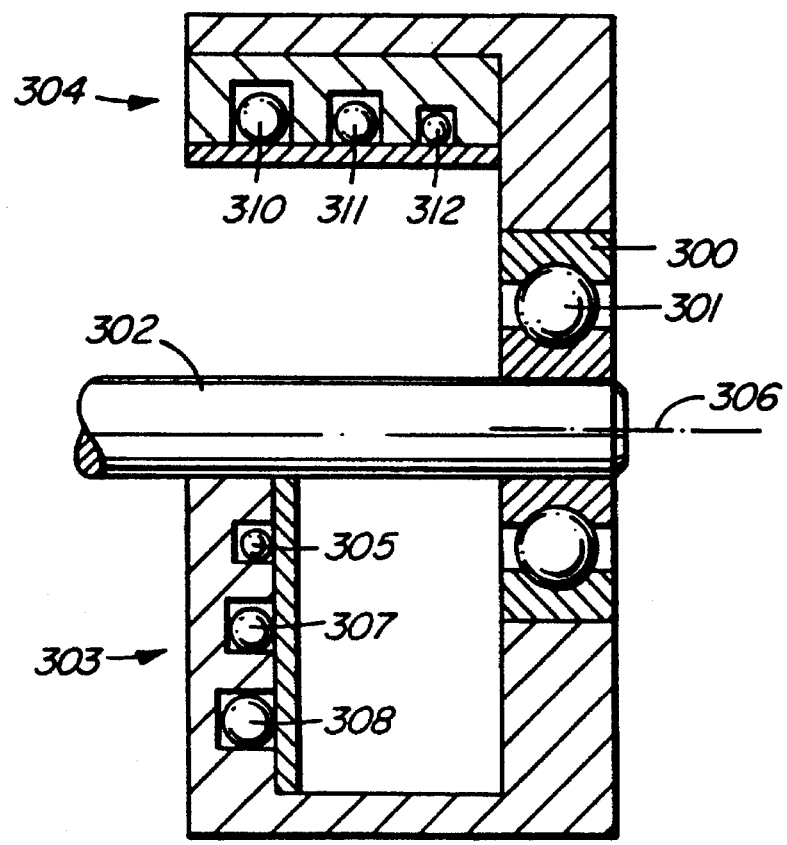
FIG. 14 is a cross-sectional view of two versions of balancing devices according to the invention, either of which might be used with an ordinary ball bearings.

Reference is now made to FIG. 14 which diagrammatically illustrates two embodiments of the invention which may be used with a bearing 300 having standard balls 301 mounted so as to allow rotation of shaft 302 with reduced friction. However, it is desirable to remove imbalances in the shaft 302 and, to that end, a balancing device 303 or a balancing device 304 may be added.

Balancing device 303 is connected so that it rotates with the shaft 302 and the movable weights in the form of balls 305 move about axis 306 of shaft 302 in a direction transverse to the direction of axis 306 and, in balancing device 304, the weights in the form of balls 310, 311, 312 rotate longitudinally or parallel to the axis 306 of the shaft 32.

The balls 305, 307, 308 are of different diameters and this applies likewise to the diameter of balls 310, 311, 312. Either configuration may be useful depending upon the geometrical considerations present in the system which is being used which includes shaft 302 and bearing 300.

Figure 15A:
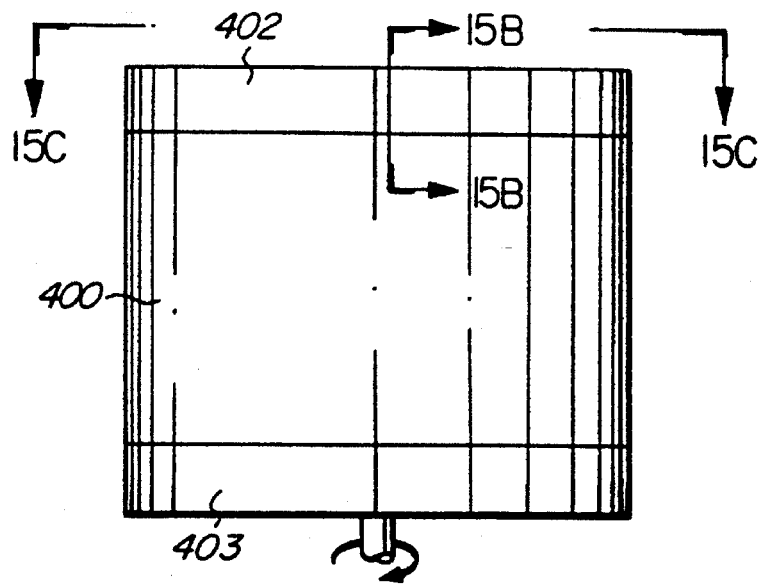
FIG. 15A is a diagrammatic view of the outside of the tub of a washing machine with balancing devices mounted thereon.

Reference is now made to FIG. 15A which illustrates the water containing cylinder or "tub" 400 of an ordinary washing machine. Two balancing devices 402, 403 are connected to the tub 400 to remove any imbalance upon operation although one, of course, may be sufficient to remove imbalances. The balancing devices 402, 403 may again take two different forms.

Figure 15B:
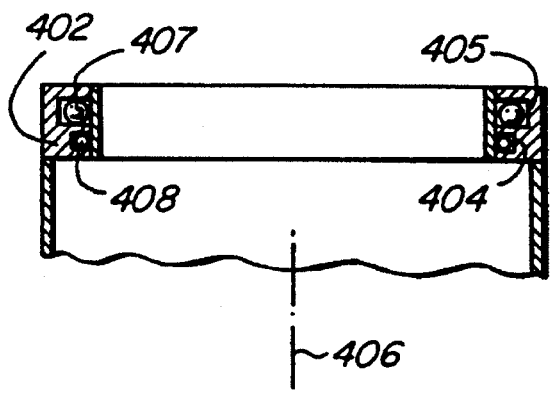
FIG. 15B is a diagrammatic view taken along 15B—15B of FIG. 15A.
Figure 15C:
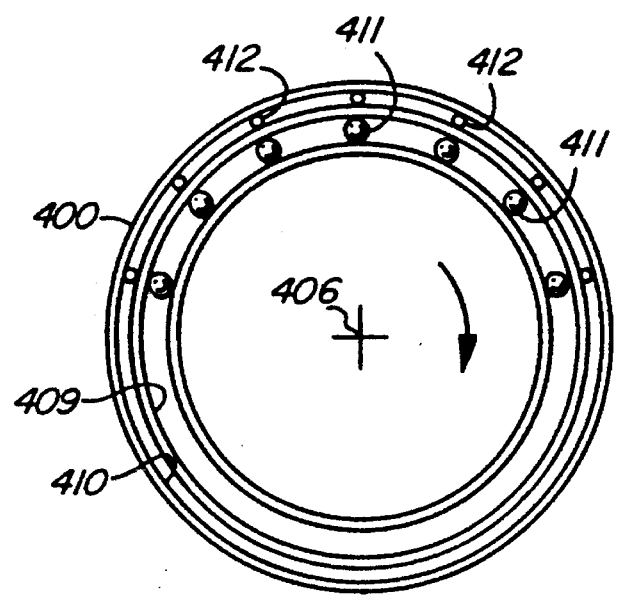
FIG. 15C is a diagrammatic view taken along 15C—15C of FIG. 15A.

Referring initially to FIG. 15B, the balancing device 402 may take the form of a plurality of grooves 403, 404 which extend circumferentially about axis 406 longitudinally or parallel to the axis 406. Movable weights in the form of balls 407, 408 are mounted in the grooves 404,405 and serve to remove imbalances when the tub 400 is rotated.

Alternatively, the balancing device 402 may have grooves 409, 410 machined transverse to axis 406. The balls 411, 412 are movable in their respective grooves 409, 410 and, again, remove imbalances when the tub 400 rotates about axis 406.

Figure 16:
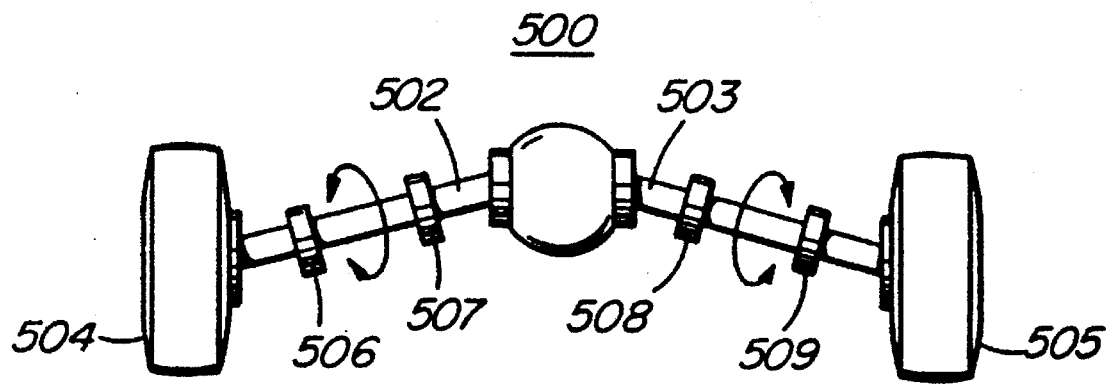
FIG. 16 is a diagrammatic view of the rear end drive axle and differential of a vehicle.

Yet a further embodiment of the invention is illustrated in FIG. 16 in which the rear end of a vehicle 500 is diagrammatically shown. A gear box or differential 501 has two axles 502, 503 extending outwardly from the gearbox 501 and connect to rear wheels 504, 505 which, of course, rotate with axles 502, 503 when the vehicle is under operation.

An imbalance may arise in the system. For example, the tires 504, 505 may become out of balance for various reasons including the fact that flats form on the tires. This is particularly true in formula race cars where the speeds of the cars vary greatly throughout a circuit and the tires are subjected to highly variable forces.

To correct the imbalance, balancing devices 506, 507 may be added to axles 502, 503, although only one per axle may be required. These would function in the same way as has been discussed as the axles 502, 503 rotate both axially and about gearbox 501 as is illustrated. In the event the rotation about gearbox 501 is not severe, it may be convenient to mount the balancing devices 508, 509 on the axles 502, 503 as is shown in FIG. 16.

Figure 17:
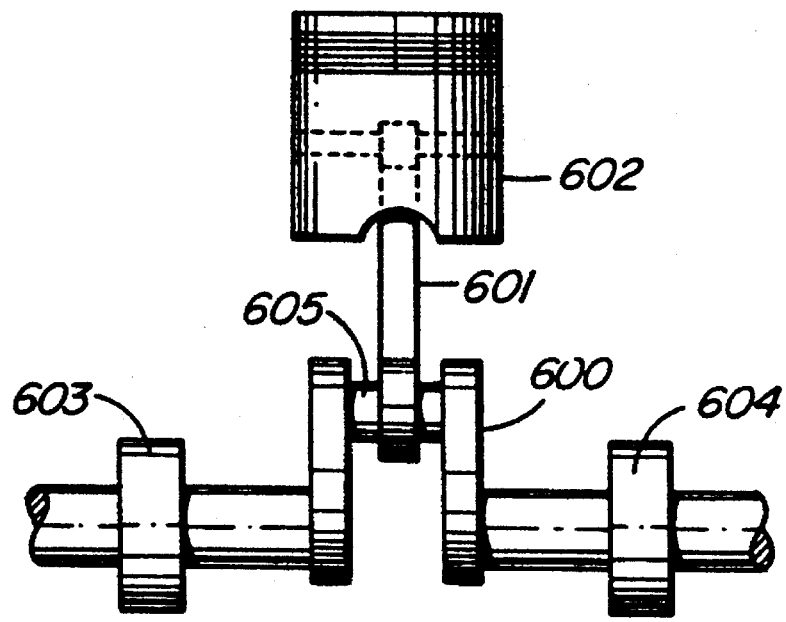
FIG. 17 is a view of a typical crankshaft which is connected to a piston of a compressor with balancing devices attached according to the invention.

Reference is now made to FIG. 17 which illustrates a crankshaft 600 having a crankpin 605 to which is attached piston rod 601 which is connected to piston 602. Piston 602 may be used, for example, in a compressor. Two balancing devices 603, 604 are connected to crankshaft 600 as illustrated. The operation of each is similar to the operations described and they serve to continuously remove imbalances in the system as previously set forth.

While it is presently anticipated that the counterbalancing apparatus according to the invention be made from a metallic material, it is also contemplated that other materials may well be appropriate such as composite material structures and plastic or the like, depending on the operating conditions under which the counterbalancing apparatus is intended to function.

While specific embodiments of the invention have been described, such embodiments should be considered as illustrative of the invention only and not as limiting its scope as defined in accordance with the accompanying claims.

What is claimed is:

1. A washing machine having a first cylindrical container rotatable about a container axis of rotation, at least one balancing device having an axis of rotation, said axis of rotation of said balancing device being concentric to said axis of rotation of said container, said balancing device having at least two circumferential passageways with axes of rotation concentric to said axis of rotation of said container, a plurality of weights movable within each of said passageways, said weights movable in said first passageway being all substantially the same size, said weights movable in said second passageway being all substantially the same size, said weights movable in said second passageway being a different size from said weights movable in said first passageway.

2. A washing machine as in claim 1 wherein said moveable weights in said first passageway and said moveable weights in said second passageway are balls.

3. A washing machine as in claim 1 wherein said moveable weights in said first passageway and said moveable weights in said second passageway are cylinders.

4. A washing machine as in claim 1 wherein said moveable weights in said first passageway and said moveable weights in said second passageway are disk-like.

* * * * *